United States Patent [19]

Opersteny et al.

[11] 4,369,605
[45] Jan. 25, 1983

[54] METHODS FOR PREPARING TUBE SHEETS FOR PERMEATORS HAVING HOLLOW FIBER MEMBRANES

[75] Inventors: Edward J. Opersteny, Chesterfield, Mo.; Alfred K. Fritzsche, Cary, N.C.

[73] Assignee: Monsanto Company, St. Louis, Mo.

[21] Appl. No.: 168,937

[22] Filed: Jul. 11, 1980

[51] Int. Cl.³ .............................................. B24B 1/00
[52] U.S. Cl. ........................................ 51/319; 51/410
[58] Field of Search ................. 51/319, 317, 290, 320, 51/322, 410, 411, 227, 413; 210/321.1, 321.2

[56] References Cited

U.S. PATENT DOCUMENTS

| | | | |
|---|---|---|---|
| 2,419,687 | 4/1947 | Luckey | 51/410 |
| 3,214,867 | 11/1965 | Henning | 51/411 |
| 3,257,759 | 6/1966 | Millhiser et al. | 51/319 |
| 3,339,341 | 9/1967 | Maxwell et al. | |
| 3,442,389 | 5/1969 | Mendelson | |
| 3,455,460 | 7/1969 | Mahoni et al. | |
| 3,503,288 | 3/1970 | Swartling | |
| 3,536,612 | 10/1970 | Kopecek et al. | 210/321.1 |
| 3,690,465 | 9/1972 | McGinnis et al. | |
| 3,702,519 | 11/1972 | Rice et al. | 51/320 |
| 3,768,211 | 10/1973 | DaCosta et al. | 51/227 H |
| 3,823,514 | 7/1974 | Tsuchiya | 51/317 |
| 3,824,739 | 7/1974 | Moret et al. | 51/322 |
| 3,939,613 | 2/1976 | Ayers | 51/320 |
| 4,183,283 | 1/1980 | Danos et al. | |

FOREIGN PATENT DOCUMENTS 1247339 9/1971 United Kingdom ................. 51/319

Primary Examiner—Stephen G. Kunin
Assistant Examiner—Robert A. Rose
Attorney, Agent, or Firm—Thomas E. Kelley

[57] ABSTRACT

A high degree of openness to the bores of hollow fiber membranes in a tube sheet can be achieved by impacting the region of the tube sheet at which hollow fiber membranes terminate with a particulate abrasive having an average maximum dimension of less than about 70 percent of the minimum dimension of the bores of the hollow fiber membranes. The particulate abrasive is impacted on the tube sheet at a velocity sufficient to erode the surface of the hollow fiber membranes.

18 Claims, 5 Drawing Figures

METHODS FOR PREPARING TUBE SHEETS FOR PERMEATORS HAVING HOLLOW FIBER MEMBRANES

This invention pertains to methods for preparing permeators having a plurality of hollow fiber membranes suitable for effecting fluid separations by permeation in which at least one end portion of each of the hollow fiber membranes is embedded in and extends through a solid material to form a tube sheet.

Permeators containing hollow fiber membranes are characterized by having at least one end of each of the hollow fiber membranes embedded in a solid material in a fluid tight manner to form a tube sheet. The bores of the hollow fiber membranes are in a fluid communication relationship through the tube sheet such that fluid can pass in and/or out of the hollow fiber membranes through the tube sheet. The tube sheet is usually positioned in a permeator shell in a fluid tight relationship, and thus, the exterior side and the bore side of each of the hollow fiber membranes are not in fluid communication except through the walls of the hollow fiber membranes. A permeate stream can be obtained from either the exterior side or bore side of the hollow fiber membranes and a non-permeating stream can be obtained from the other side.

The efficiency of a permeator will, to some extent, depend on the ability of fluids to flow at the exterior sides and bore sides of the membranes. For example, if fluid flow is restricted, a reduction in permeate recovery and/or purity may result. It is therefore highly desirable that the bores of the hollow fiber membranes are open for fluid communication through the tube sheet. Usually, the length of the bores of the hollow fiber membranes are free from obstructions which may restrict fluid flow. However, the openings to the bores of the hollow fiber membranes can easily become obstructed during the preparation of the tube sheet. Even minor obstructions at the opening into the bore of a hollow fiber membrane may produce a significant increase in the resistance to fluid flow into or out of the bore and may thus adversely affect the fluid separation. Accordingly, methods for preparing tube sheets in which the openings to the bores of substantially all of the hollow fiber membranes are not unduly restricted, are particularly desired.

In most instances tube sheets are prepared by embedding the hollow fiber membranes in a liquid potting material. The liquid potting material is then solidified. Usually the solidified material containing the hollow fiber membranes is severed transversely to the longitudinal orientation of the hollow fiber membranes to provide a face at which the bores of the hollow fiber membranes terminate and to open the bores of the hollow fiber membranes. During the severing of the tube sheet, the opening to the bores of many of the hollow fiber membranes may not be completely open.

Various methods have been suggested for severing a solid potting material containing hollow fiber membranes in order to provide a tube sheet with a high openness to the bores of the hollow fiber membranes. For instance, Swartling in U.S. Pat. No. 3,503,288 notes at column 2, lines 33 et seq., that the cutting of a tube sheet comprised of epoxy is difficult because the micro-sized fiber openings become smeared closed when cut with conventional cutting tools with conventional cutting action. Swartling notes that an unconventional severing method, fracturing an epoxy tube sheet by the application of a controlled bending force or shaped explosive charge, has provided a bore openness approaching 100 percent, but that such a method is commercially and technically unacceptable since it is difficult to utilize with larger diameter tube sheets due to the substantial forces required, there is difficulty in predicting and controlling the fracture, and damage may occur to the integrity of the tube sheet. Swartling disclosed an apparatus for cutting an epoxy tube sheet which apparatus employs a specially designed, strong, rigid cutting element which is circumferentially moved with respect to the epoxy tube sheet under certain conditions of speed, cutting angle and the like. Although the apparatus is complex, Swartling reports improved openness using the apparatus.

Another approach to severing tube sheets and providing a high degree of openness to the bores of the hollow fiber membranes involves severing the tube sheet in a convenient manner and then trimming the region of the tube sheet containing the ends of the hollow fiber membranes to provide a high degree of openness to the bores. Swartling states at column 3, lines 70 et seq., that one of the more effective methods for opening the bores of severed epoxy tube sheets is by hand trimming with a scalpel. However, such hand trimming operations are not only time consuming but may be significantly influenced by the skill of the individual doing the hand trimming. Moreover, in view of the small size of hollow fiber membranes, regions within the tube sheet face (particularly with larger tube sheet faces) may be missed during the hand trimming operation.

Danos, et al., in U.S. Pat. No. 4,183,283 disclose methods for opening the bores of hollow fiber membranes embedded in a solid material. The tube sheet, for instance, can be severed in any suitable manner and then a thin layer of the tube sheet is removed using a knife blade edge moving in an essentially arcuate path at a sufficient velocity to cause fracturing of at least one of the hollow fiber membranes and the solidified potting material at the point of contact with a knife edge. The region at the entrance to the hollow fiber membranes can thus be cleanly cut away providing a high degree of openness to the bores of the hollow fiber membranes. The thin layer may conveniently be removed by the use of a planing or milling machine. Although the methods of Danos, et al., can provide tube sheets having a high openness to hollow fiber membrane bores, the achievement of a suitable degree of openness can be dependent upon the maintenance of a sufficiently sharp knife blade edge. Consequently, with solid materials forming the tube sheet which are particularly hard or which contain hard particles, the knife blade may have to be frequently replaced or resharpened, otherwise the high degree of openness may not be achieved.

By this invention, methods are provided for preparing tube sheets containing hollow fiber membranes embedded in a solid material such that the bores of a high proportion of the hollow fiber membranes are open and that the opening to each of the bores is relatively unobstructed. Advantageously, the methods of this invention need not rely upon the skill of the individual preparing the tube sheet nor is the frequent replacement or sharpening of, e.g., knife blades, required. Furthermore, the methods of this invention are suitable for automation in a relatively non-complex manner without any deleterious effects on the quality of the tube sheet or compromising achieving a high degree of openness to the bores of the hollow fiber membranes. The methods of this invention may even be suitable for treating tube sheets having high strength and/or containing particles of high strength. Moreover, a high degree of openness of the bores can be achieved in relatively little processing time and with uniformity across the tube sheet, even with relatively large size tube sheets.

In accordance with this invention, a tube sheet is provided such that the bores of the hollow fiber membranes terminate at least one face of the tube sheet. (The face of the tube sheet is transverse to the longitudinal orientation of the hollow fiber membranes.) The face of the tube sheet is then impacted with a particulate abrasive having an average maximum dimension of less than about 70 percent of the minimum dimension of the bores of the hollow fiber membranes. The particulate abrasive is preferably angular, i.e., the abrasive preferably has edges, corners or the like such that it tends to grab, or bite into, a surface being impacted rather than having a smooth surface such as provided by a sphere. The particulate abrasive is impacted on the tube sheet surface at a velocity sufficient to erode the surface of the hollow fiber membrane. Advantageously, the particulate abrasive is impacted on the surface of the tube sheet at an angle of at least about 10, and generally up to about 70, degrees from the plane of the tube sheet face at the region of the impacting. The methods of this invention not only tend to remove material which may obstruct or partially obstruct the bores of the hollow fiber membranes at the face of the tube sheet, but also, the opening to a bore of a hollow fiber membrane may be flared thereby even further reducing any resistance to fluid flow into or out of the bore of the membrane.

The tube sheets comprise the end portions of hollow fiber membranes embedded in a solid material. This solid material is often referred to as a potting material. The end portions of the hollow fiber membranes can be embedded in the potting material in any suitable manner. Most commonly, the potting material is a solidifiable, liquid potting material when the hollow fiber membranes are embedded therein. The liquid potting material is capable of being solidified, e.g., by cooling or curing, to form a solid structure having the hollow fiber membranes embedded in a fluid-tight relationship. Several processes are available for embedding the hollow fiber membranes in a liquid potting material. For instance, the end of said segments of the hollow fiber membranes may be individually coated with the liquid potting material and then the end segments joined laterally to form an aggregate (or bundle) of the hollow fibers in a desired cross-sectional configuration such as disclosed in U.S. Pat. Nos. 3,455,460 (Mahon) and 3,690,465 (McGinnis, et al.), both herein incorporated by reference. Alternatively, a casting procedure may be employed such as disclosed in U.S. Pat. Nos. 3,339,341 (Maxwell, et al.) and 3,442,389 (Mendelson), both herein incorporated by reference. For example, the end segments of the hollow fiber membranes may be joined laterally and placed in a mold. The liquid potting material can then be introduced around or within the bundle of hollow fiber membranes in the mold. To assist in distributing the liquid potting material through the cross-section of the bundle, pressure may be applied to the liquid potting material, e.g., by centrifuging.

In order to prevent the liquid potting material from entering the bores of the hollow fiber membranes, the hollow fiber membranes must either pass through the zone which is to be contacted with the liquid potting material (e.g., by being looped into a mold for casting the tube sheet) or the ends of the hollow fiber membranes must be plugged. The plugging of the ends of the hollow fiber membranes may be accomplished by, for instance, melt sealing the ends of the hollow fiber membranes such as disclosed in application Ser. No. 329,836, filed Dec. 11, 1981, a continuation of copending U.S. patent application Ser. No. 78,871, filed Sept. 26, 1979 (Woodcock), abandoned, or providing a solidifiable sealing, e.g., a liquid cement, wax, etc., at the ends of the hollow fiber membranes.

After solidifying the liquid potting material, it may be necessary to sever the tube sheet transverse to the longitudinal orientation of the hollow fiber membranes to expose the bores of the hollow fiber membranes. If, for instance, the ends of the hollow fiber membranes had been plugged to prevent the influx of potting material to the bores, the severing should remove a sufficient amount of the tube sheet that the plugged ends are removed. Similarly, if the hollow fiber membranes are looped in the tube sheet, the severing should remove the loop such that the bores of the hollow fiber membranes are available for fluid communication through the tube sheet. The severing of the tube sheet may serve to provide a tube sheet of an appropriate dimension for fabricating the permeator. The severing of the tube sheet can be conducted employing any suitable means regardless of the resulting openness of the bores of the hollow filaments provided that undue damage to the fluid tight relationship between the solidified potting material and the hollow fiber membranes does not occur. Hence, conventional cutting tools such as saws or knives can be employed. The tools employed for severing can thus be chosen on the basis of processing efficiency in severing the tube sheet and the simplicity of and capital expense required for such tools.

If the hollow fiber membranes extend beyond the zone which is contacted with the liquid potting material to form the tube sheet, it may not be necessary to sever the potting material. Preferably, however, the hollow fiber membranes are removed, e.g., by using a saw, knife, shears, etc., to approximately the face of the tube sheet.

Whether or not the tube sheet needs to be severed to expose the bores of the hollow fiber membranes, at least one face is provided on the tube sheet at which the bore of essentially each of the hollow fiber membranes terminates. In accordance with the methods of this invention, this face of the tube sheet is impacted with particulate abrasive. Any suitable particulate abrasive may be employed. Generally the average maximum dimension (cross-sectional) of the particulate abrasive is less than about 70, preferably less than about 50, percent of the minimum cross-sectional dimension of the bores of the hollow fiber membranes. Most preferably, essentially all of the particulate abrasive has a maximum dimension less than about 70, say, less than about 50, percent of the minimum cross-sectional dimension of the bores of the hollow fiber membranes. By the use of particulate abrasives which are substantially smaller than the minimum cross-sectional dimension of the bores of the hollow fiber membranes, the risk of the particulate abrasive becoming embedded in the bores of the hollow fiber membranes is reduced. Moreover, such small particulate abrasive can more readily enter the region of the hollow fiber membranes around the opening of the bore to provide the advantageous, flared bore opening. Since the erosive action of the particulate abrasive is, in part, a function of the mass of the particulate abrasive, it is usually preferred that the average maximum dimension of the particulate abrasive be at least about 5 or 10 microns. Frequently, the average maximum dimension of the particulate abrasive is about 10 to 200, say, about 30 to 70 microns.

The shape of the particulate abrasive can also effect the erosive activity of the particulate abrasive. It is generally preferred that the particulate abrasive be angular, i.e., have angularities such as relatively sharp edges, corners, and the like to enhance the erosive activity of the particulate abrasive. One convenient manner for describing the angularity of particulate abrasives is by the average shape factor of the particulate abrasive. A shape factor is defined as the quotient of the area of a sphere equivalent to the volume of the particle divided by the actual surface of the particle and is dimensionless. Hence, a cube has a shape factor of about 0.8, and a tetrahedron has a shape factor of about 0.65. Frequently, the average shape factor for the particulate abrasive is less than about 0.9, e.g., about 0.5 to 0.85.

The particulate abrasive should be comprised of a material which provides sufficient hardness and durability to be useful in eroding the surface of the hollow fiber membranes. Usually the particulate abrasive has a hardness of at least about 6, say, about 6 to 10, on the moh scale. Frequently the particulate abrasive contains a metal, metal oxide, or metal carbide or mixtures or alloys thereof of metals such as aluminum, silicon, titanium, chromium, iron, nickel, copper, zinc, tin, tantalum, and tungsten. Due to availability, silica, silicon carbide, and aluminum oxide particulate abrasives are often employed. Naturally occurring crystalline materials such as sand, quartz, and the like may also be useful.

The angle at which the particulate abrasive strikes the face of the tube sheet can affect the rate or erosion. For instance, if the incidence angle (i.e., the angle at which the particulate abrasive strikes the tube sheet with respect to the plane of the tube sheet at the region of impact) is less than about 10°, the rate of erosion may be very low, thereby requiring longer durations of treatment to provide the desired degree of openness to bores of the hollow fiber membranes. Similarly, if the incidence angle is too large the time required to effect the desired erosion may be excessive, and the particulate abrasive may enter the bores of the hollow fiber membranes to an undesirable depth. Generally, the incidence angle is at least about 10° and less than about 70°, for instance, 15° to 60°, and most often about 20° to 50°.

The velocity of the particulate abrasive is sufficient to erode the surface of the hollow fiber membranes. The velocity of the particulate abrasive which may be suitable to erode the surface of the hollow fiber membranes will depend, among other factors, upon the mass of the particulate abrasive, the angularity of the particulate abrasive, and the visco-elastic properties of the hollow fiber membrane. For example, with lighter particulate abrasives, greater velocities may be required to generate the necessary energy to effect the erosion of the surface of the hollow fiber membrane. With hollow fiber membranes made with materials having greater elasticity, higher particulate abrasive velocities may be required. Advantageously, the particulate abrasive is at a velocity sufficient to result in chipping, i.e., fracturing, at the surface of the hollow fiber membranes. The velocity of the particulate abrasive may, but need not, be sufficient to result in erosion of the solid potting material. Since any potting material which may be obstructing the opening to the bores of the hollow fiber membranes may be structurally weak, it is usually readily removed by the impacting of the particulate abrasive whether or not the velocity of the particulate abrasive is sufficient to result in significant erosion of the solid potting material. The velocity of the particulate abrasive immediately prior to impact at the surface of the tube sheet is usually at least about 70, e.g., about 90 to 200, meters per second.

A desirably high degree of openness to the bores of the hollow fiber membranes can usually be accomplished in a very short period of time by the treatment with particulate abrasives as provided by this invention. For instance, a high degree of openness to the bores may, in some instances, occur within a few seconds of initiation of treatment by erosion with particulate abrasives. The duration of the treatment will depend, among other factors, upon the mass of the particulate abrasive, the shape of the particulate abrasive, the velocity of the particulate abrasive, the material of the particulate abrasive, the material of the hollow fiber membranes, and the incident angle of the impact. Also, the duration will depend upon the number of impacts per unit surface area per unit time (impact density). In most instances, a desired openness to the bores of the hollow fiber membranes can be achieved in less than about 30 minutes. Most often, however, the desired openness of the bores can be achieved in less than about 5 minutes, say, about 10 seconds to 5 minutes. In a practical sense it is difficult to obtain a uniform impact density for uniform period of time over the entire face of the tube sheet. Advantageously, the methods of this invention can produce tube sheets having the desired degree of openness to the bores of the hollow fiber membranes even though some regions of the face of the tube sheet may be impacted with the particulate abrasive at a greater rate and for longer periods of time than other regions of the tube sheet face. In many instances, the solid potting material is harder than the material of the hollow fiber membranes. Consequently, the velocity of the particulate abrasive may be such that the surface of the hollow fiber membranes is eroded while the erosion, if any, of the potting material is at a relatively slow rate. Once the entrance to the bore of the hollow fiber membrane becomes open and flared, usually little, if any, additional material of the hollow fiber membranes is removed by further impacting with the particulate abrasive. Therefore, the methods of this invention can provide considerable flexibility in operation since regions of the face of the tube sheet can be impacted for longer periods of time with higher impact densities than other regions on the face of the tube sheet. Yet, the surface of the potting material may be relatively uniform across the face of the tube sheet, and the hollow fiber membranes in the region receiving the greater treatment may not be adversely affected.

In order to ensure that the bores of substantially all of the hollow fiber membranes in the tube sheet are open, it is necessary that the particulate abrasive be directed to impact all regions of the tube sheet face containing the hollow fiber membranes. Also, in many instances, it may be necessary for the particulate abrasive to impact the hollow fiber membranes from different directions to provide the desired degree of openness to the bores of the hollow fiber membranes. Commonly, essentially the entire region of the tube sheet containing the hollow fiber membrane is treated with the particulate abrasive emanating from different directions with respect to the longitudinal axis of the hollow fiber membranes. Frequently, this difference in directions is at least about 30°, e.g., about 30° to 180° with respect to the axis of the hollow fiber membrane. Conveniently, more than one source of the propelled particulate abrasive may be employed and/or at least one of the source of the propelled particulate abrasive and the tube sheet are moveable in order to treat essentially the entire region of the tube sheet containing the hollow fiber membranes and to provide particulate abrasive to impact the tube sheet from different directions.

Upon impact of a particulate abrasive particle with the surface of the tube sheet, kinetic energy of the particulate abrasive is transformed into, e.g., physical deformation or breaching of any one or more of the particulate abrasive, solid potting material and hollow fiber membranes with the ultimate production of heat. The heat can be absorbed by the tube sheet and the particulate abrasive. The build-up of undue amounts of heat can lead to the softening of the material of the hollow fiber membranes and the solid potting material such that the material flows (deforms) rather than erodes upon impact with the particulate abrasive. Thus, if the temperature of the tube sheet becomes too high, the openings to the bores of the hollow fiber membranes could become smeared or at least partially occluded. However, the build-up of such unduly excessive temperatures can readily be obviated by continually using fresh particulate abrasive or allowing the particulate abrasive, after its impact with the tube sheet, to sufficiently cool prior to recycling. Unlike the use of knives, milling machines, etc., ample time can be provided for cooling of particulate abrasive prior to its reuse to impact the tube sheet. Moreover, a fluid may be continually passed to the region of the tube sheet being impacted by particulate abrasive in order to remove heat. Advantageously, by intermittently impacting any given region of the tube sheet, sufficient time may be provided for the dissipation of generated heat. This intermittent impacting may conveniently be provided by impacting only a portion of the face of the tube sheet at any given time and moving the region of impacting to different areas of the tube sheet during the treatment by, for instance, rotating the tube sheet.

Any suitable means may be used to propel the particulate abrasive for impact on the surface of the tube sheet. One suitable means involves entraining the particulate abrasive and a fluid traveling at a high speed. The fluid may be a gas or a liquid at the operating conditions, and most frequently is air. Equipment for propelling particulate abrasives by entraining the particulate abrasives in a fluid is well known and is readily available. Another suitable means for propelling particulate abrasives is by mechanically accelerating the particulate abrasives using, for instance, a centrifugal throwing wheel. Apparatus for mechanically propelling particulate abrasives is also well known and readily available. The spent particulate abrasive can advantageously be recovered for reuse. Generally, fine particles, either from the erosion of the tube sheet or from the shattering of the particulate abrasive are removed. For safety reasons, the apparatus for treating the tube sheet with particulate abrasive should enclose the region being treated to prevent escape of fine particles and dust which may be produced.

The following drawings are for purposes of illustration only and do not serve to limit the invention. In the drawings.

Figure 4A:
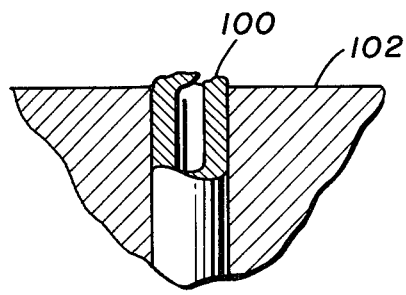
Figure 4B:
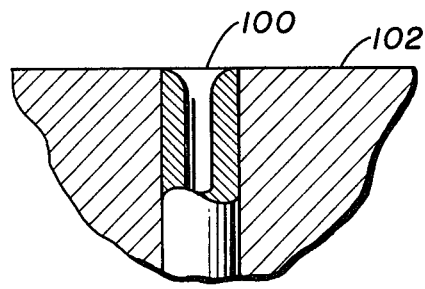
Figure 4C:
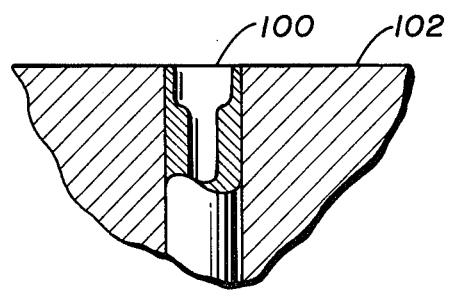

FIGS. 4a, 4b, and 4c are schematic depictions of hollow fiber membranes embedded in a potting material prior to treatment with the particulate abrasive and at various stages of treatment with the particulate abrasive.

Figure 1:
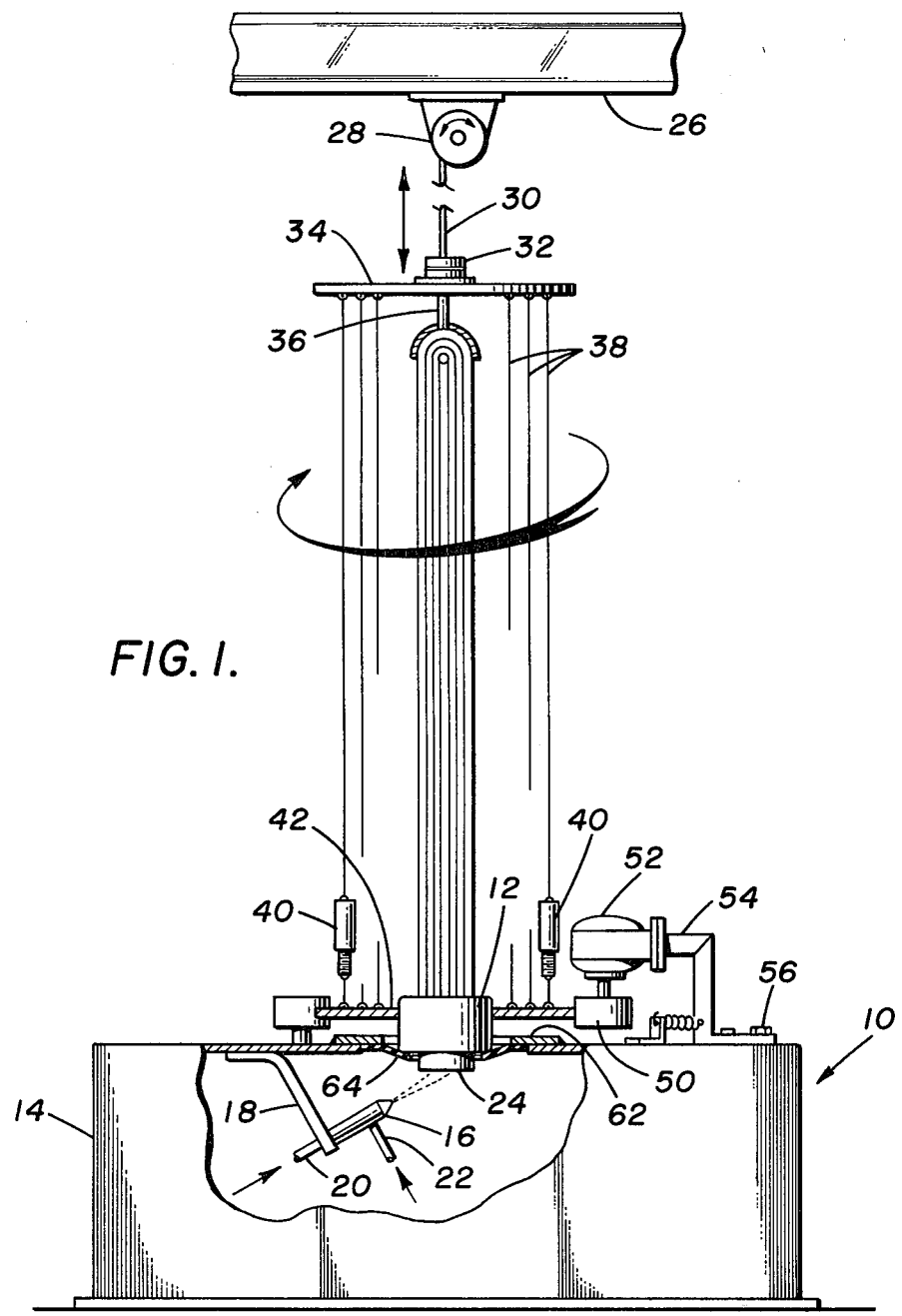
FIG. 1 is a vertical schematic drawing to illustrate one type of apparatus for carrying out a method of this invention for opening the bores of the hollow fiber membranes.
Figure 3:
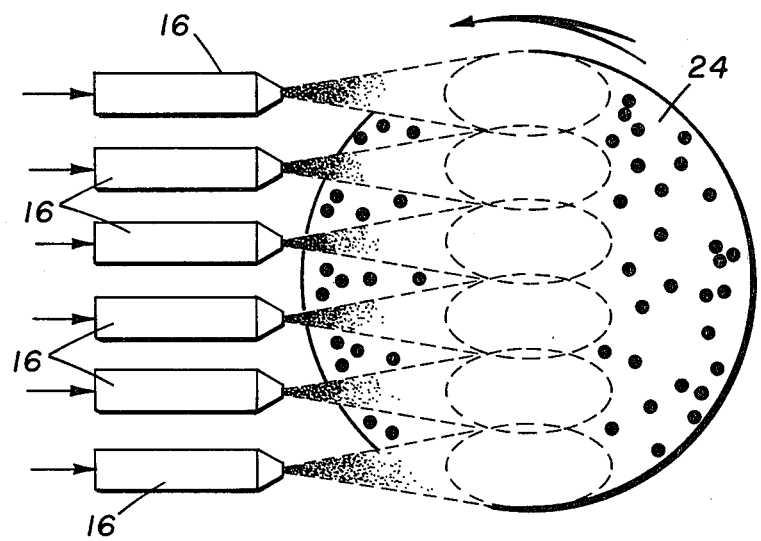

With reference to FIG. 1, an abrasive blasting apparatus generally designated to the numeral 10 is depicted with tube sheet 12 positioned within the apparatus for treatment. The abrasive blasting apparatus 10 is depicted as comprising cabinet 14 with an opening in its upper surface. A break away section is provided to illustrate the means utilized to propel the particulate abrasive. Pneumatic blast head 16 is supported by member 18 affixed to the cabinet 14. As shown, blast head 16 is spaced away from the face of tube sheet 12 and is oriented at an angle of about 30° to the plane of the face of tube sheet 12. Compressed air passes via line 20 from a compressed air source (not shown) to blast head 16. The compressed air is usually at a pressure of at least about 2.5 or 3 kilograms per square centimeter and may be as high as about 10 or 20 kilograms per square centimeter. Particulate abrasive is passed via line 22 to blast head 16 and is entrained in the compressed air within blast head 16. As depicted in FIG. 3, a series of blast heads 16 may be employed in the blasting apparatus. The purpose of blast head 16 is to direct the particulate abrasive to regions on the face of tube sheet 12 at sufficient velocities to erode the surface of the hollow fiber membranes and provide a high degree of openness to the bores of the hollow fiber membranes.

Figure 2:
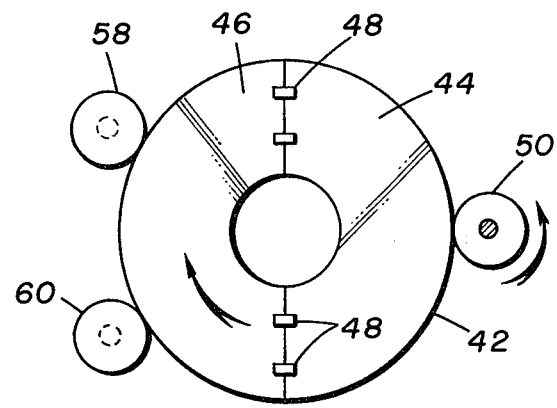
FIG. 2 and FIG. 3 are schematic representations of portions of the apparatus depicted in FIG. 1 and serve to more clearly describe features of the apparatus depicted in FIG. 1.

Tube sheet 12 has face 24 at which the hollow fiber membranes terminate and, as depicted, the hollow fiber membranes extend from the opposite side of tube sheet 12 in an essentially parallel manner to form a bundle. Since blast head 16 is fixed and the tube sheet is oriented with its face down, the tube sheet is mounted in a moveable manner with means to support the bundle of the hollow fiber membranes. As shown, the tube sheet and bundle assembly is supported from elevated fixed beam 26. Hoist means 28 is rigidly fixed to beam 26, and cable 30 extends downwardly from hoist 28. Cable 30 is connected to swivel 32 which provides for a relatively frictionless rotation. Swivel 32 in turn is affixed to upper support bracket 34. Rigidly affixed to upper support bracket 34 is bundle support 36 which is adapted to support the bundle of hollow fiber membranes at the upper portion of the bundle. Extending downwardly from upper support bracket 34 is a plurality of lines 38 having length adjusters 40 thereon. Lines 38 are used to support drive disc 42 which fixedly engages tube sheet 12. As depicted in FIG. 2, drive disc 42 comprises segments 44 and 46 which are held together by a plurality of buckles 48. Thus, segments 44 and 46 can be spread apart to insert tube sheet 12, and then the segments are mated and fastened with buckles 48 to fixedly secure tube sheet 12. This suspension means for the tube sheet and bundle enables the bundle of hollow fiber membranes to be supported with minimal stresses being exerted on the hollow fiber membranes.

Drive disc 42 is adapted to be rotated and thereby rotate tube sheet 12 in order that all regions of the face of the tube sheet containing hollow fiber membranes will be impacted by particulate abrasive. In order to rotate drive disc 42, the periphery of drive disc 44 is engaged with drive roller 50 which is fixedly linked to variable speed motor 52. The variable speed motor 52 is preferably a direct current motor having an adjustable speed control. The variable speed motor 52 is fixedly mounted on arm 54 which, in turn, is pivotably mounted to cabinet 14 by bolt 56. Arm 54 is preferably under a spring tension such that drive roller 50 pivots toward the periphery of drive disc 42. On the opposite side of drive disc 42 from drive roller 50, the periphery of the drive disc contacts idler rollers 58 and 60. The idler rollers rotate freely and are mounted to the top of cabinet 14.

In order to prevent the escape of particulate abrasive and debris from within cabinet 14 dust shield 62 extends around tube sheet 12 and has mounted thereon flexible seal 64 which sufficiently contacts tube sheet 12 to prevent the escape of particulate abrasive and debris from the cabinet. A vent means (not shown) can be provided on the cabinet to remove via an exhaust stream, debris suspended in the chamber defined by the cabinet. The exhaust stream may be filtered to remove suspended debris prior to being released to the atmosphere.

In operation, the bundle of hollow fibers is suspended from bundle holder 36. The drive disc 42 is then assembled around tube sheet 12 and the length of lines 38 is adjusted using line adjuster 40 such that some of the forces on the hollow fiber membranes to support the tube sheet are minimized. Hoist 28 then lowers cable 30 such that the face of tube sheet 12 is positioned in cabinet 14 for being impacted with propelled particulate abrasive. Arm 54 is then allowed to pivot such that drive roller 50 contacts the periphery of drive disc 42, and the drive disc is held within idler rollers 58 and 60 and drive roller 50. The variable speed motor 52 is preferably slowly accelerated in order to minimize the magnitude of forces placed on the hollow fiber membranes.

As depicted in FIG. 3, a plurality of blast heads 16 is positioned such that a region extending from the center to the periphery of the face 24 of tube sheet 12 can be impacted by particulate abrasive at any given time. Thus by rotating the tube sheet, the entire face of tube sheet 12 will be contacted with particulate abrasive. Since the pattern of the abrasive extends over a wide region of the tube sheet face, particulate abrasive will contact the tube sheet from different directions to ensure a desirable openness to the bores of the hollow fiber membranes. Normally, the speed of rotation of the tube sheet may be relatively low, e.g., less than about 30, say, about 1 to 20, revolutions per minute. Preferably, the rotation of tube sheet 12 is initiated prior to the propelling of the particulate abrasive to impact the tube sheet. After sufficient treatment with the particulate abrasive, the propelling of the particulate abrasives can be terminated, and the rotation of the tube sheet slowly brought to a stop such that an undue risk of damage to the hollow fiber membranes does not exist. Hoist 28 can then raise the tube sheet from the blasting apparatus, the drive disc disassembled, and the bundle of hollow fibers removed from bundle holder 36.

FIG. 4a is a schematic illustration of a single hollow fiber membrane 100 embedded in a solidified potting material 102. As shown, a portion of the hollow fiber membrane has been drawn across, or smeared across, the entrance to the bore of the hollow fiber membrane. FIG. 4b is a schematic illustration of the same hollow fiber membrane after being impacted by a propelled particulate abrasive for a short period of time. As can be seen, the material obstructing the bore of the hollow fiber has been removed and the opening to the bore has become flared out. After further erosion by the impact of particulate abrasive, the opening of the bore becomes further flared out as can be seen in FIG. 4c. Generally, little, if any, additional flaring results if the treatment with the propelled particulate abrasive is continued.

The methods of this invention are suitable for providing a high degree of openness to the bores of hollow fiber membranes contained in tube sheets of varying sizes and configurations. While the cross-sectional configuration (i.e., the configuration lying in a plane perpendicular to the longitudinal orientation of the hollow fiber membranes) of tube sheets is usually generally circular, it is also apparent that the cross-sectional configuration may be in any other form such as triangular, trilobal, square, rectangular, trapezoidal, pentagonal, hexagonal, free form, or the like. The maximum cross-sectional dimension of the tube sheet may also vary substantially. For instance, the maximum cross-sectional dimension of the tube sheet may be as little as 0.5 centimeter for laboratory-scale experimentation to 1 meter or more for treating large volume fluid streams. The face of the tube sheet may be any suitable configuration and is generally substantially the same configuration as the cross-sectional configuration of the tube sheet. The face may be substantially flat or may be curved or irregular in surface contour. Since the methods of this invention utilize propelled particulate abrasive to provide a high degree of openness to the bores of the hollow fiber membranes, the contour of the face usually does not adversely affect obtaining the desired degree of openness. The tube sheet may contain one or more bundles of hollow fiber membranes.

The hollow fiber membranes may be of any convenient configuration, e.g., circular, hexagonal, trilobal, or the like in cross-section and may have ridges, grooves, or the like extending inwardly or outwardly from the walls of the hollow fiber membranes. Generally, the maximum outside cross-sectional dimension of the hollow fiber membranes is at least about 10 microns and often is up to about 1000 or more microns. In many instances it is preferred that the maximum interior dimension (maximum bore dimension) of the hollow fiber membranes be at least about 30, say, at least about 50 to about 300 or 500 microns. The ratio of the wall thickness to maximum outside dimension of the hollow fiber membranes is frequently about 0.05 to 0.48, e.g., about 0.2 to 0.4. The hollow fiber membranes may be isotropic, i.e., having substantially the same structure throughout the thickness of the wall, or anisotropic, i.e., having one or more regions within the thickness of the wall having a more dense structure. The hollow fiber membranes are useful in fluid separations, i.e., they may serve as the support for coating which provides selective separation or as the medium which affects the separation.

Advantageously, this invention enables a wide range of materials to be employed for the fabrication of the hollow fiber membranes. Thus, many materials which are highly elastic may be suitable for the hollow fiber membranes which materials may tend to smear closed the entrance to the bores of the hollow fiber membranes when severed with, e.g., a knife. The material for the hollow fiber membranes may be synthetic or natural and may be inorganic, organic or organic mixed with inorganic. Typical inorganic materials for the hollow fiber membranes may be glasses, ceramics, cermets, metals, and the like. The organic materials are generally polymeric in nature. Typical polymers suitable for the hollow fiber membranes can be substituted or unsubstituted polymers and may be selected from polysulfones; poly(styrenes), including styrene-containing copolymers such as acrylonitrile-styrene copolymers, styrene-butadiene copolymers and styrene-vinylbenzylhalide copolymers; polycarbonates; cellulosic polymers, such as cellulose acetate-butyrate; cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylylene oxide); poly(esteramide-diisocyanate); polyurethanes; polyesters (including polyarylates) such as poly(ethylene terephthalate), poly(alkyl methacrylates), poly(alkyl acrylates), poly(phenylene terephthalate), etc.; polysulfides; poly(siloxanes); polymers from monomers having the alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above and grafts and blends containing any of the foregoing. Typical substituents providing substituted polymers include halogens such as fluorine, chlorine and bromine; hydroxy groups, lower alkyl groups; lower alkoxy groups; monocyclic aryl; lower acyl groups and the like. The polymer may contain modifiers, plasticizers, fillers, etc.

The potting material to form the tube sheet may be comprised of any suitable material. Preferably the potting material can be in liquid form when preparing the tube sheet and can thereafter be solidified, e.g., by cooling, curing, or the like. The solidified potting material should exhibit sufficient structural strength for providing a tube sheet and be relatively inert to moieties to which it will be exposed during fluid separation operations. Often, a useful guide for selecting suitable materials for the potting material is the impact strength of the solid potting material. For instance, suitable solid potting materials frequently exhibit an Izod impact strength (ASTM D-256) of at least about 0.05, e.g., say, about 1 to 100 or more, centimeter-kilogram per centimeter of notch.

The potting material may be organic, inorganic or organic containing inorganic material, and the potting material may be natural or synthetic. Typical inorganic materials include glasses, ceramics, cermets, metals, and the like. Conveniently, the potting material comprises a solidifiable resin. Typical resins include phenolaldehyde resins, melamine-aldehyde resins, thermosetting artificial rubbers, acrylic resins, urethane resins, silicone resins, polysulfides, acetals, cellulosics, fluorocarbons, vinyls, styrenes, polyethylene, polypropylene, and other olefinically-unsaturated monomers, and the like. Particularly attractive potting materials are the epoxy resins, e.g., from polyglycyl resins preferably containing one or more diglycidyl compounds (including glycidyl-terminated prepolymers). Often the polyglycidyl resins are polyglycidyl ethers derived from resorcinol, catechol, hydroquinone, phloroglucinol, 4,4'-dihydroxybenzophenone, 1,1-bis(4-hydroxyphenyl) ethane, 2,2-bis(4-hydroxyphenyl) propane (Bisphenol A), bis(2-hydroxynaphthyl) methane, 2,2-bis(4-hydroxyphenyl) butane, 4,4'-dihydroxyphenyl phenyl sulfone, ethylene glycol, propylene glycol, butanediol, pentanediol, isopentanediol, in oleic dimer acid, poly(oxypropylene) glycol, 2,4,4'-trihydroxybisphenyl, 2,2'-4,4'-tetrahydroxybisphenyl, Bisresorcinol F, 2,2'-4,4'-tetrahydroxybenzophenone, 1,1-bis(hydroxyphenyl) cyclohexane, bisphenol-hexafluoroacetone, aniline, paraaminophenol, isocyanurate, cyanuric chloride, hydantoin, tetraphenylene ethane, phenol-formaldehyde novolac, o-creson-formaldehyde novolac, cycloaliphatic epoxy resins, and the like. These resins may be substituted, e.g., with hydroxyl or halogen moieties, e.g., fluorine, chlorine and bromine (such as tetrabrominated bisphenol A).

Commonly, the epoxy is cured with a curing agent. Examples of curing agents include polyamines, polymethylenediamines, polyalkyletherdiamines, dialkylenetriamines (e.g., diethylenetriamine), trialkylenetetraamines (e.g., triethylenetetraamine), N-aminoethylethanolamine, 1,3-bis(dimethylamino)-2-propanol, menthanediamine, aminoethylpiperazine, 1,3-diaminocyclohexane, bis(p-aminocyclohexyl) methane, m-phenylenediamine, m-xylylenediamine, 4,4'-diaminodiphenylmethane, diaminodiphenylsulfone, piperazine, N-methylpiperazine, 2,4,6-tris(dimethylaminomethyl) phenol (DMP-30), tri-2-ethylhexoate salt of DMP-30, modified aliphatic polyamines such as halohydrin ethers of glycol polyamine adducts, dimethamine adducts of alloocimene diepoxide, amino alkoxysilane adducts of propylene oxide, hydroxypolyamines, etc.; imidazole curing agents such as imidazole, N-butylimidazole, 1-acetylimidazole, 1-trifluoroacetylimidazole, 1-perfluorobenzoylimidazole, 1,2-dimethylimidazole, 2-methylimidazole, 2-ethylimidazole, 2-nitroimidazole, 2-ethyl-4-methyl-imidazole, 2-methyl-5-nitroimidazole, 4-phenylimidazole, 4,5-diphenylimidazole, 4-nitroimidazole, and benzimidazole; acidic curing agents such as boron trifluoride, aluminum chloride, boron trifluoride monoethylamine, maleic anhydride, phthalic anhydride, chlorendic anhydride, pyromellitic dianhydride, benzophenonetetracarboxylic dianhydride, dodecenyl succinic anhydride, nadic methyl anhydride, tetrahydrophthalic anhydride, hexahydrophthalic anhydride, etc.; amides such as amidopolyamines, fatty polyamines, phosphorous amides (e.g., p-phenylene bis(anilinophenylphosphine oxide)); ureas (including substituted ureas and urea-formaldehydes); N,N-diallyl-melamine; triallyl cyanurate; hydrazides; amino acetals such as bis(2-dimethylaminoethoxy) methane, bis(1-dimethylamino-2-propoxy) methane, 1,6-bis(2-dimethylaminoethoxy) hexane, α,α-bis(2-dimethylaminoethoxy)-p-xylene, bis(3-dimethylamino-1-propoxy) methane, 2,6-bis(2-dimethylaminoethoxy) pyridine, 2,6- bis(1-dimethylamino-2-propoxy) pyridine, 2,6-bis(3-dimethylamino-1-propoxy) pyridine, bis(2-dimethylaminoethoxy) methane, bis(2-N-morpholinoethoxy) methane, 1,1-bis(2-dimethylaminoethoxy) propane, 2,2-bis(2-dimethylaminoethoxy) propane, α,α'-bis(2-dimethylaminoethoxy) toluene, 1,1-bis(2-dimethylaminoethoxy) butane, 1,1-bis(2-dimethylaminoethoxy) ethane, and 1,1,2,2-tetrakis(2-dimethylaminoethoxy) ethane; and the like.

The potting material may contain other components such as plasticizers, bond promoting agents, cure accelerators, thickening agents, dyes and pigments.

A more detailed discussion of potting materials may be found in, U.S. Pat. No. 4,323,454, issued Apr. 6, 1982, incorporated herein by reference.

The following example is provided as an illustration of one embodiment of the methods of this invention. All parts and percentages of solids and liquids are by weight and all parts and percentages of gases are by volume unless otherwise indicated.

A bundle of about 25,000 anisotropic hollow fiber membranes comprised of polysulfone derived from bisphenol A (available as P-3500 from Union Carbide Corporation) and having an exterior skin, an outside diameter of about 450 microns, an inside diameter of about 150 microns, and heat sealed hollow fiber ends, is placed into an aluminum mold which has been sprayed with a silicone mold release. The mold has a slightly tapered upper chamber having a maximum diameter at the top of approximately 15 centimeters and a depth of approximately a 13 centimeters and has a concentric lower chamber having a diameter of approximately 10 centimeters and a depth of approximately 8 centimeters. A liquid resinous composition is introduced into the mold containing the bundle of hollow fiber membranes. The liquid resinous composition comprises about 1800 grams of an unmodified bisphenol A epoxy resin having a viscosity of about 65–95 poises at 25° C. and an epoxy equivalent weight of about 180 to 190 (available as EPON TM 826 available from Shell Company); 1300 grams of aluminum powder (average particle size of about 20 to 30 microns); 200 grams of neopentyl glycol diglycidyl ether; 80 grams of a polyamide reactive resin having a viscosity of about 2 to 6 poises at 75° C. and an amine value of about 370 to 400 (available as Versamid TM 140 from General Mills, Inc.); and 70 grams of 2-ethyl-4-methylimidazole (available as EMI-24 TM from Fike Chemical Company). The resin is cured substantially in accordance with the procedure set forth in Example 3 of U.S. Pat. No. 4,323,454.

After solidification of the resin, the thusly formed tube sheet is removed from the mold and the portion of the tube sheet formed by the lower chamber of the mold is severed perpendicularly to the longitudinal orientation of the hollow fiber membranes approximately 3 to 7 centimeters from the portion formed by the larger chamber of the mold to expose the hollow fiber membranes. The tube sheet and bundle of hollow fiber membranes are than positioned in an abrasive blasting apparatus such as depicted in FIG. 1. The apparatus has 8 blast heads spaced about 2.5 centimeters apart and about 10 centimeters from the face of the tube sheet. The blast heads have boron carbide nozzles having nozzle diameters of about 9.5 millimeters.

The rotation of the tube sheet is initiated with slow acceleration to about 10 revolutions per minute and then is impacted with aluminum oxide abrasive (280/320 grit available from Norton Company, Worcester, Mass). Air at a pressure of about 6 kilograms per square centimeter gauge and 1.5 normal cubic meters per minute per blast head is used as the propelling fluid. The air pressure and nozzle size establish the rate of abrasive throughput for each blast head. The duration of the impacting is about 40 seconds. The resulting tube sheet has a high degree of openness to the bores of the hollow fiber membranes, and the entrance to each of the bores is flared.

It is claimed:

1. A method for opening the entrance to bores of hollow fiber membranes embedded in a solid potting material to form a tube sheet wherein the hollow fiber membranes terminate at at least one face of the tube sheet comprising externally blasting the surface of said at least one face of the tube sheet with a particulate abrasive having an average maximum cross-sectional dimension of less than about 70 percent of the minimum cross-sectional dimension of the bores of the hollow fiber membranes at a velocity sufficient to erode the surface of the hollow fiber membranes.

2. The method of claim 1 wherein the incidence angle of the particulate abrasive with respect to the surface of the tube sheet being blasted is at least about 10° and less than about 70°.

3. The method of claim 2 wherein the particulate abrasive is angular.

4. The method of claim 3 wherein the particulate abrasive has a shape factor of about 0.5 to 0.85.

5. The method of claim 2 wherein the velocity of the particulate abrasive is about 90 to 200 meters per second.

6. The method of claim 5 wherein the maximum cross-sectional dimension of the bores of the hollow fiber membranes is about 50 to 500 microns and the average maximum cross-sectional dimension of the particulate abrasive is about 10 to 200 microns.

7. The method of claim 3 wherein the particulate abrasive has a hardness of at least about 6 on the moh scale.

8. The method of claim 7 wherein the particulate abrasive comprises at least one of silica, silicon carbide, and aluminum oxide.

9. The method of claim 3 wherein the solid potting material is harder than the material of the hollow fiber membranes.

10. The method of claim 9 wherein the solid potting material exhibits an impact strength of at least about 0.5 centimeter-kilograms per centimeter of notch (Izod impact strength ASTM D-256).

11. The method of claim 9 wherein the solid potting material comprises epoxy resin.

12. The method of any of claims 1, 3, 5, 9 or 11 wherein the material of the hollow fiber membranes comprises polysulfone.

13. The method of any of claims 1, 3, 5 or 9 wherein the particulate abrasive blasts the face of the tube sheet from different directions with respect to the longitudinal axis of the hollow fiber membranes.

14. The method of any of claims 1, 3, 5 or 9 wherein the tube sheet is severed to expose hollow fiber membranes prior to the blasting with particulate abrasive.

15. The method of any of claims 1, 3, 5 or 9 wherein particulate abrasive, after blasting the face of the tube sheet, is reused for further blasting the face of the tube sheet, and the particulate abrasive is cooled prior to reuse.

16. The method of any of claims 1, 3, 5 or 9 wherein a fluid is passed to the tube sheet during the blasting to remove heat.

17. The method of any of claims 1, 3, 5 or 9 wherein the tube sheet is blasted with particulate abrasive for a time sufficient to flare the entrances to the bores of the hollow fiber membranes.

18. The method of any of claims 1, 3, 5 or 9 wherein regions on the face of the tube sheet are intermittently blasted with particulate abrasive.

* * * * *